US012637326B2

(12) United States Patent
Torlai et al.

(10) Patent No.: US 12,637,326 B2
(45) Date of Patent: May 26, 2026

(54) TWIST RESISTANT ELEVATOR SUSPENSION MEMBER

(71) Applicant: OTIS ELEVATOR COMPANY, Farmington, CT (US)

(72) Inventors: David R. Torlai, Torrington, CT (US); Ralle A. Rookey, Suffield, CT (US); Alexander Serkh, Troy, MI (US); Bardia Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/657,077

(22) Filed: May 7, 2024

(65) Prior Publication Data

US 2025/0346454 A1 Nov. 13, 2025

(51) Int. Cl.
*B66B 7/10* (2006.01)
*B66B 11/00* (2006.01)

(52) U.S. Cl.
CPC ............ *B66B 7/10* (2013.01); *B66B 11/0065* (2013.01)

(58) Field of Classification Search
CPC ..... B66B 11/0065; B66B 7/10; B66B 7/1215; B66D 1/28
See application file for complete search history.

(56) References Cited

U.S. PATENT DOCUMENTS 8,100,796 B2 * 1/2012 O'Donnell ............. D07B 1/025 427/175
12,006,191 B2 * 6/2024 Sessions ............. B66F 9/07572
2013/0237358 A1 * 9/2013 Hollowell ............... B29C 70/20 474/260

FOREIGN PATENT DOCUMENTS

JP 2009526723 A * 2/2006
WO WO-2005068696 A1 * 7/2005 ................ B21F 7/00
WO WO-2020200430 A1 * 10/2020 ............. B66B 7/062
WO WO-2020200431 A1 * 10/2020 ........... B29B 15/122

OTHER PUBLICATIONS

Machine Translation of JP 2009-526723.*

* cited by examiner

*Primary Examiner* — Diem M Tran
(74) *Attorney, Agent, or Firm* — Carlson, Gaskey & Olds, P.C.

(57) ABSTRACT

A method and assembly includes pre-tensioning an elevator suspension member to adjust low load elongation of tension members within the elevator suspension member prior to placing the elevator suspension member in operation for an elevator.

21 Claims, 3 Drawing Sheets

TWIST RESISTANT ELEVATOR SUSPENSION MEMBER

BACKGROUND

Elevator systems are in widespread use for carrying passengers between various levels in buildings. Some elevator systems are traction-based in which a suspension assembly, sometimes referred to as roping, suspends the elevator car and a counterweight. The suspension assembly also facilitates movement of the elevator car when needed. One type of suspension assembly includes flat belts that have tension members encased in a compressible polymer jacket. Such suspension members may experience twisting and tracking issues if individual tension members take on an unequal permanent stretch during operation.

SUMMARY

An illustrative example method includes: pre-tensioning an elevator suspension member to adjust low load elongation of tension members within the elevator suspension member prior to placing the elevator suspension member in operation for an elevator.

In a further non-limiting embodiment of the method, the pre-tensioning is based on a load that is:

- less than or equal to ¼ of a load rating of the elevator suspension member; or
- greater than ⅙ of the load rating of the elevator suspension member.

In a further non-limiting embodiment of any of the methods, the elevator suspension member comprises an elevator belt having a plurality of the tension members encased in a jacket.

In a further non-limiting embodiment of any of the methods, the tension members comprise steel cords.

In a further non-limiting embodiment of any of the methods, the method further comprises: forming each steel cord from a plurality of wires that are all twisted together in one direction.

In a further non-limiting embodiment of any of the methods, the method further comprises: applying the pre-tensioning to one or more of the tension members prior to encasing the tension members in the jacket.

In a further non-limiting embodiment of any of the methods, the method further comprises: applying the pre-tensioning to the elevator belt after encasing the tension members in the jacket.

In a further non-limiting embodiment of any of the methods, the method further comprises: pre-tensioning the elevator belt during installation of an elevator car in a hoistway.

In a further non-limiting embodiment of any of the methods, the method further comprises: supporting the elevator car in the hoistway with the elevator belt, and applying a pre-determined load to the elevator belt by adding weight to the elevator car; and wherein the pre-determined load is less than or equal to ¼ of a load rating of the elevator suspension member or the pre-determined load is greater than ⅙ of the load rating of the elevator suspension member.

In a further non-limiting embodiment of any of the methods, the method further comprises: supporting the elevator car with one or more additional elevator belts and applying the pre-determined load to each elevator belt.

In a further non-limiting embodiment of any of the methods, the method further comprises removing the weight from the elevator car once a desired low load elongation is achieved and subsequently releasing the elevator car for operation.

In a further non-limiting embodiment of any of the methods, the method further comprises: pre-tensioning one or more of the tension members or the elevator belt by passing the tension members or the elevator belt over a plurality of sheaves during a manufacturing process.

In a further non-limiting embodiment of any of the methods, the method further comprises: applying a restrictive force to one or more sheaves of the plurality of sheaves to achieve pre-tensioning.

In a further non-limiting embodiment of any of the methods, the method further comprises: providing one or more sheaves of the plurality of sheaves as a crowned sheave to provide pre-tensioning.

In a further non-limiting embodiment of any of the methods, the method further comprises: forming the tension members to comprise at least a first type of tension member and a second type of tension member; wherein the pre-tensioning is accomplished by providing a first low load elongation for one or more tension members of the first type of tension member and providing a second low load elongation for one or more tension members of the second type of tension member; and wherein the second low load elongation is different than the first low load elongation.

In a further non-limiting embodiment of any of the methods, the first type of tension members comprise one or more outermost edge tension members and the second type of tension members comprise one or more centermost tension members.

In a further non-limiting embodiment of any of the methods, the first low load elongation is higher than the second low load elongation.

An illustrative elevator suspension member includes: an elevator belt having a plurality of tension members encased in a jacket, and wherein the elevator belt is pre-tensioned to adjust low load elongation of tension members within the elevator belt prior to placing the elevator belt in operation for an elevator.

In a further non-limiting embodiment of any of the elevator suspension members, the tension members comprise steel that are each formed from a plurality of wires that are all twisted together in one direction, and including:

- applying the pre-tensioning to one or more of the tension members prior to encasing the tension members in the jacket, or
- applying the pre-tensioning to the elevator belt after encasing the tension members in the jacket.

In a further non-limiting embodiment of any of the elevator suspension members, the plurality of tension members comprise at least: a first type of tension member having a first low load elongation; and a second type of tension member having a second low load elongation, wherein the second type of tension member is positioned between a pair of the first type of tension member, and the second low load elongation is lower than the first low load elongation.

The various features and advantages of an example embodiment will become apparent to those skilled in the art from the following detailed description. The drawings that accompany the detailed description can be briefly described as follows.

DETAILED DESCRIPTION

Embodiments of this disclosure provide an elevator suspension member that is pre-tensioned or pre-stretched prior to being put into operation.

Figure 1:
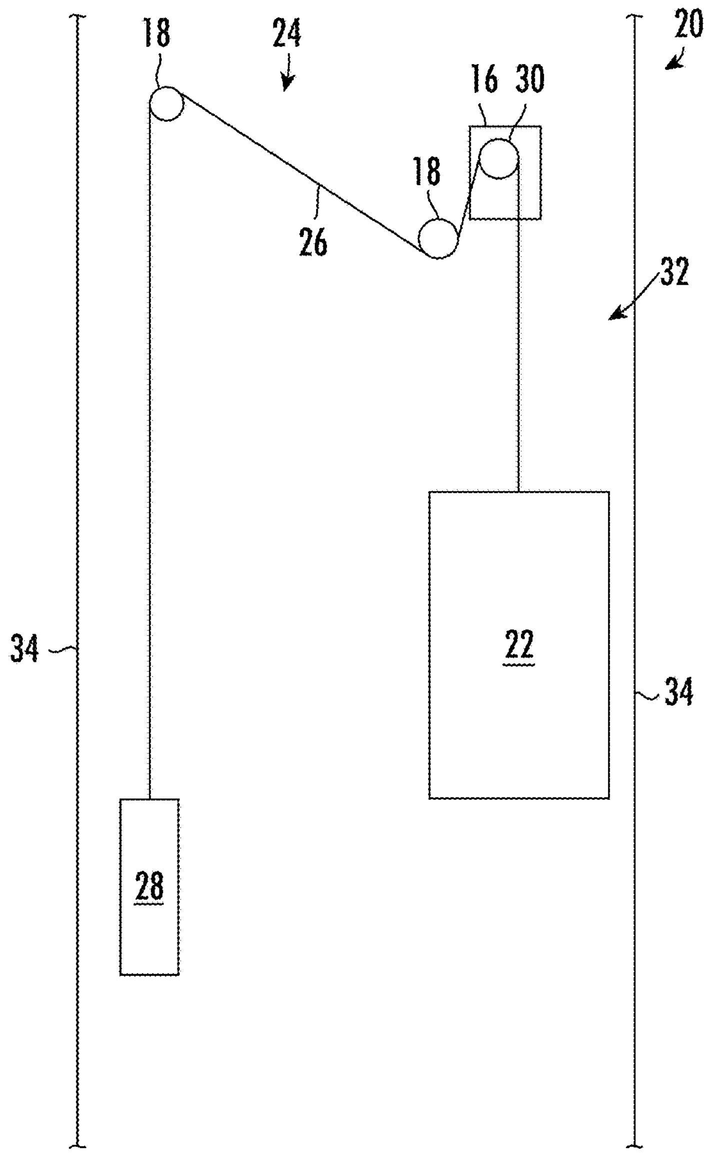
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of suspension members 26. In one example, the elevator system 20 is a traction-based system in which a controller controls operation of a machine 16 to cause selected movement of the elevator car 22. The elevator car 22 is coupled to a counterweight 28 by the suspension members 26. The suspension members 26 are driven by the machine 16 around a traction sheave 30, as well as any additional deflector sheaves 18, as the elevator car 22 moves within a hoistway 32 between landings or levels. The hoistway 32 may be situated in a variety of locations within a building, depending on the building configuration, and includes a plurality of walls 34.

Figure 2:
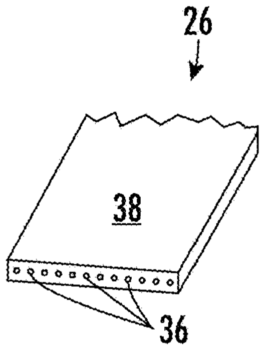
FIG. 2 schematically illustrates a portion of an example suspension member.

FIG. 2 schematically illustrates a portion of an example suspension member 26. In the illustrated embodiment, the suspension member 26 is a flat belt including a plurality of tension members 36 that are encased in a jacket 38 of a compressible material, such as polyurethane or other similar materials for example. In one example, the tension members 36 include steel cords, and the suspension member 26 is referred to as a coated steel belt (CSB), for example. Other examples may include tension members that are made of different materials and jacket surfaces that are not flat, such as those that incorporate ribs, grooves, or similar features.

Coated belts with multiple tension members or cords can experience twisting and tracking issues if individual cords take on an unequal permanent stretch during operation. This stretch is a function of the cord construction, loading, and sheave configuration. In one example, the subject disclosure eliminates the initial stretch through loading of one or more of the cords to a prescribed amount based on the factor of safety of the suspension member. The loading can be performed on individual cords/tension members during manufacturing or as an assembled suspension member, e.g., an elevator belt. It has been demonstrated that when a sufficient load is applied, the initial stretch is taken out of the one or more cords such that permanent deformation of the elevator belt does not occur during elevator operation.

In one example, a cord construction includes having a plurality of the cords being made from a plurality of wires 42 (FIGS. 4-B) that are all twisted together. Such wires 42 may be twisted together in one way or in one direction. This may create a twisting/sabering/curvature effect. One example of such a cord construction includes a Warrington design. The cord construction may include at least two layers of wires 42 that are arranged around a center wire or an inner layer of wire 42 to different diameters of wires 42 alternating between large and small diameters in the outer layer, which result in different elongation behavior that can result in sabering of the belt after repeated bending cycles over crowned sheaves, for example. Sabering can cause undesirable mis-tracking or misalignment of elevator belts during operation. Additionally, elevator belts that pass over crowned sheaves, may impart differential loading on the cords. This can lead to reduced performance of the elevator belt in such aspects as fatigue and wear, causing elevator use downtime.

Figure 3A:
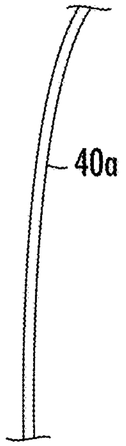
FIG. 3A shows an example of a cord that exhibits twisting/sabering.
Figure 3B:
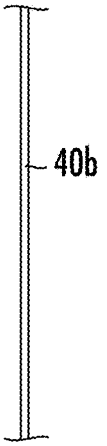
FIG. 3B shows an example of a cord that has been pre-stretched to reduce the twisting/sabering effect.

FIG. 3A shows an example of a belt **40*a* that exhibits sabering. In this example, the belt 40*a* is shown as laying flat on a floor. In this example, the belt 40*a* exhibits sabering which includes a degree of twist about a cord axis extending along a length of the belt 40*a*. FIG. 3B shows an example of a belt 40*b* that has been pre-stretched to reduce the sabering effect as it is shown that the belt 40*b* is laying straight, i.e. not twisted, on the floor. The belt 40*b*** shown in FIG. 3B is unlikely to result in undesirable mis-tracking or misalignment or result in impart differential loading on the cords.

Figure 9:
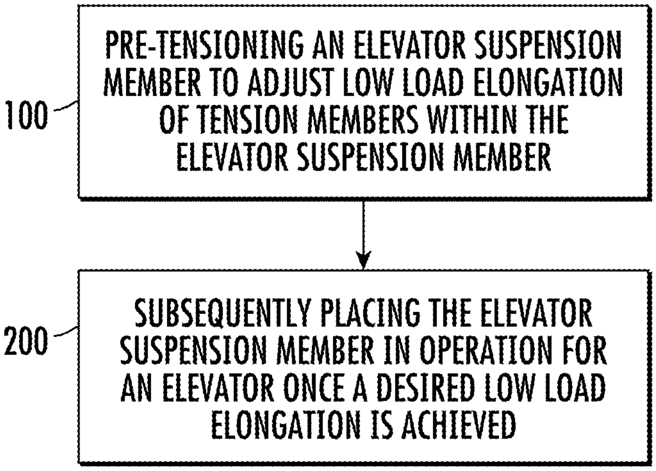
FIG. 9 is a flowchart diagram of an example method of pre-tensioning a suspension member.

In one example, the subject disclosure provides a method (FIG. 9) that includes pre-tensioning an elevator belt 26 to adjust low load elongation of tension members 36 within the elevator belt 26 (see step 100) prior to placing the elevator belt 26 in operation for an elevator (see step 200). A specific load to set the pre-tension for the elevator belt 26 can vary per the number of tension members 36, i.e. cords, that are in the belt 26. In one example, the pre-tensioning is based on a load that is less than or equal to ¼ of a load rating of the elevator belt 26 and greater than ⅒ of the load rating of the elevator belt 26. In one example, the pre-tensioning load is approximately ⅛ of the load rating of the elevator belt. In this example, if the load rating of the belt is 80 kN than the load would be set at 10 kN.

Figure 4A:
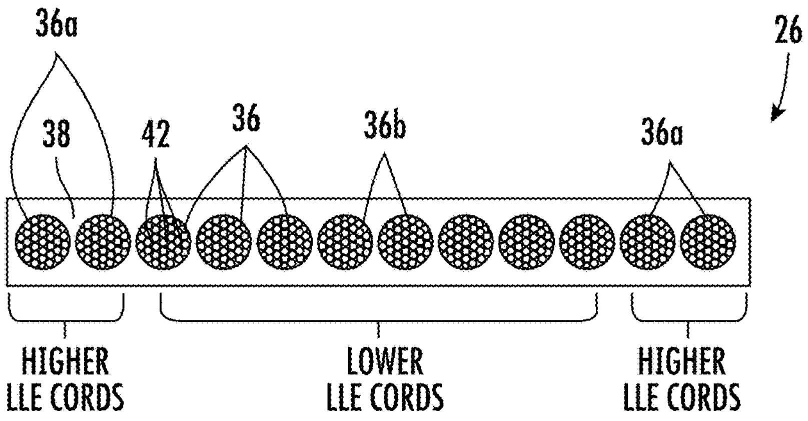
FIG. 4A shows one example of a cross-section of a belt having variable low load elongation (LLE) cords with higher LLE cords on outer edges of the belt.
Figure 4B:
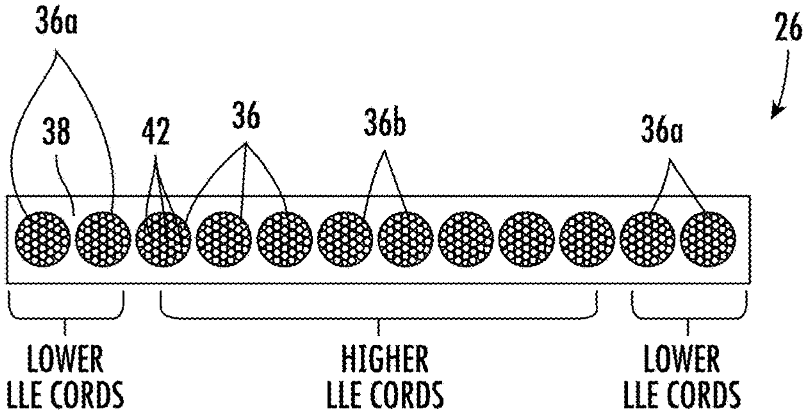
FIG. 4B shows another example of a cross-section of a belt having variable low load elongation cords with lower LLE cords on outer edges of the belt.

In one example, the subject disclosure applies tension members/cords 36 with different low load elongation (LLE), reported as elongation between 2% and 10% of minimum breaking load (MBL), based on the lateral placement in the belt 26. FIG. 4A shows one example of a cross-section of a belt 26 including a plurality of tension members/cords 36 that are linearly spaced apart from each other across a width of the belt 26. In one example, edge cords **36*a* which constitute the outermost cords across the belt section, e.g. one or two cords 36*a* on each outermost side of the belt 26, would have a different LLE characteristic than center cords 36*b*, e.g. centermost two or more cords 36*b* that are between the outermost side edge cords 36*a*. In one example, a variation in LLE across the belt may be at least 10%, preferably 20%, or higher. In one example embodiment, the outermost cords 36*a* would have a higher LLE than the LLE of the center cords 36*b*. It is contemplated that belts 26 constructed with a variation of LLE (center cords having a lower LLE than the outermost cords) will also reduce the likelihood of wires of tension members/cords 36 protruding through the outer surface of the belt 26. In an alternate configuration, the outermost cords 36*a* may have a lower LLE than the center cords 36***b* as shown in FIG. 4B. The differential LLE will allow equalization of elongation because the center cords 36*b* are more heavily loaded and elongate more than the outer edge cords 36*a* as a result of running over crowned sheaves.

Figure 5:
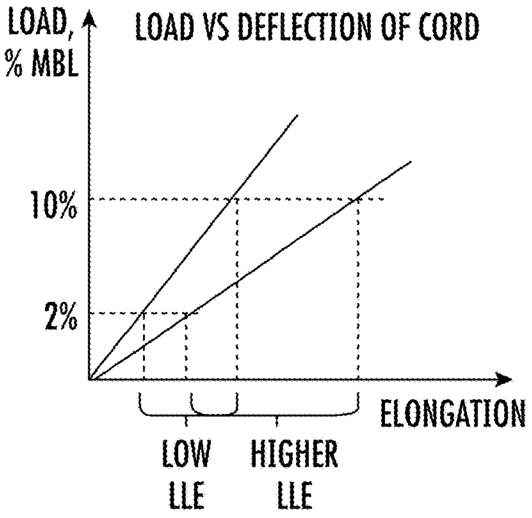
FIG. 5 shows a graph depicting load vs. deflection of a tension member.

FIG. 5 shows a graph depicting load vs. deflection of the cord. In one example, elongation between 2% and 10% of MBL is shown on a vertical load axis depicting a percentage of MBL. Elongation is shown on a horizontal axis and depicts ranges for lower LLE vs. higher LLE in relation to the 2% and 10% of MBL.

Figure 6:
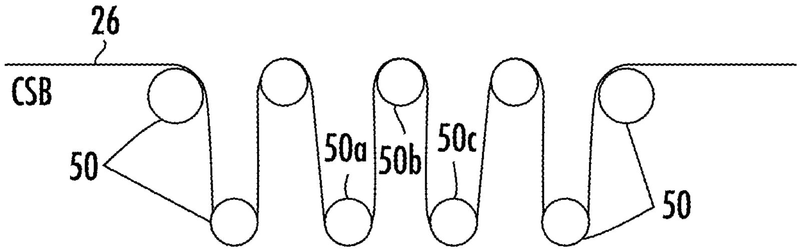
FIG. 6 is a schematic representation of a tension member/belt being passed over a plurality of sheaves for pre-stretching.

In one example, the subject disclosure provides pre-stretching during belt manufacturing by pre-stretching either the cords 36 themselves or by pre-stretching the belt 26 after it has been completed. In one example, this type of manufacturing pre-stretch of cords 36 or belts 26 can be accomplished by passing the cords 36 or belts 26 over several sheaves 50 as shown in FIG. 6. In one example, a predetermined number of these sheaves 50, e.g. a subset of sheaves 50*a*, 50*b*, 50*c* that comprises one or more sheaves of the total number of sheaves 50, could impart a tension load that pre-stretches the belt 26 as applied during a manufacturing process.

Figure 7:
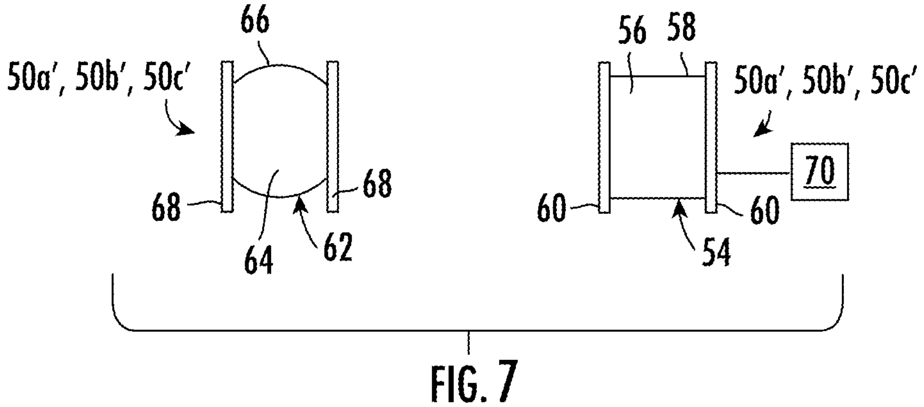
FIG. 7 is a schematic representation of different types of sheaves.

FIG. 7 shows one example of a standard sheave body 54 for the subset of sheaves 50*a*, 50*b*, 50*c*. In this example, the standard sheave body 54 has a cylindrical portion 56 defined by a constant diameter outer surface 58 that extends between edge flanges 60. The belt 26 lies across the outer surface 58 and is seated between the edge flanges 60 as the belt 26 passes over the sheave.

FIG. 7 also shows one example of a crowned sheave body 62 for the subset of sheaves 50*a*', 50*b*', 50*c*'. In this example, the crowned sheave body 62 has a center portion 64 defined by an outer surface 66 that extends between edge flanges 68. The outer surface 66 includes a curved surface that has a minimum diameter immediately adjacent each edge flange 68 and continuously increases to a maximum diameter in direction away from each edge flange 68 to a center location between the edge flanges 68. The belt 26 lies across the outer surface 66 and is seated between the edge flanges 68 as the belt 26 passes over the sheave.

In one example, a restrictive force is applied to one or more of the sheaves 50*a*, 50*b*, 50*c* to achieve pre-tensioning. This restrictive force includes applying a retarding force or creating friction, for example. A retarding force or torque could be applied to the sheaves 50*a*, 50*b*, 50*c* via a hydraulic motor 70 or other similar device, for example.

In one example, the sheaves 50*a*', 50*b*', 50*c*' are crowned sheaves that are used to provide the pre-tensioning. In one example, a predetermined number of these sheaves, e.g. a subset of the sheaves that includes one or more sheaves of the total number of sheaves, could incorporate the crowned outer surface 66 (FIG. 7) that would stretch the cords 36. This would allow for improved tension balancing between the cords 36 while operating over crowned sheaves.

It has been demonstrated that when a sufficient load is applied during the passing of the cords 36 or belts 26 over several sheaves 50*a*, 50*b*, 50*c* or sheaves 50*a*', 50*b*', 50*c*', the initial stretch is taken out of the cords 36 such that permanent deformation of the belt 26 does not occur during elevator operation. Additionally, improved tension balancing in operation may improve the belt performance and life.

Figure 8:
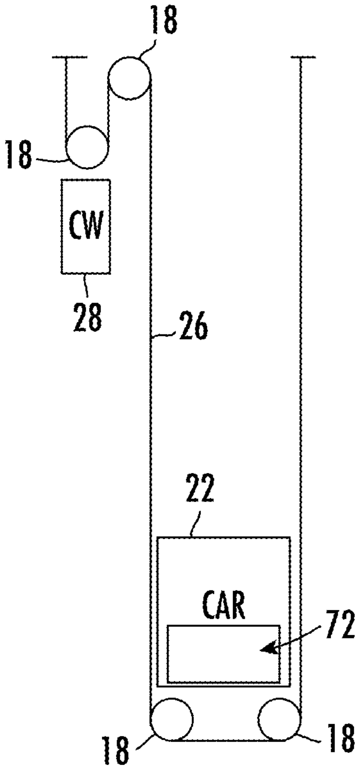
FIG. 8 is a schematic representation of pre-stretching during elevator installation.

In one example, the subject disclosure provides pre-stretching of the belts during installation of the elevator system 20 as shown in FIG. 8. In one example, the elevator systems 20 may have more than one belt 26 and each belt 26 is installed in sequence and subsequently each belt 26 or several belts 26 are exposed to a predetermined load. For example, additional weight 72 can be added to the elevator car 22 during installation to increase tension on the belts 26 to achieve the desired amount of pre-stretching/pre-tensioning. This is a simple, accurate, and effective way to provide belt pre-stretching. Additionally, this solution may also save time required to adjust (shortened) belt length to compensate for construction stretch.

In one example, a method includes supporting the elevator car 22 in the hoistway 34 with the elevator belt 26, and applying a pre-determined load to the elevator belt 26 by adding the weight 72 to the elevator car 22. If there are additional belts 26 that are used to support the car 22, the pre-determined load is applied to each elevator belt. Once a desired low load elongation is achieved, the weight 72 is removed from the elevator car 22 and the elevator car 22 is subsequently released for operation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A method comprising:
pre-tensioning an elevator suspension member to adjust low load elongation of tension members within the elevator suspension member prior to placing the elevator suspension member in operation for an elevator;
wherein the pre-tensioning is based on a load that is:
less than or equal to ¼ of a load rating of the elevator suspension member; or
greater than ⅙ of the load rating of the elevator suspension member.

2. The method of claim 1, wherein the elevator suspension member comprises an elevator belt having a plurality of the tension members encased in a jacket.

3. The method of claim 2, wherein the tension members comprise steel cords.

4. The method of claim 3, further comprising:
forming each steel cord from a plurality of wires that are all twisted together in one direction.

5. The method of claim 2, further comprising:
applying the pre-tensioning to one or more of the tension members prior to encasing the tension members in the jacket.

6. The method of claim 2, further comprising:
pre-tensioning one or more of the tension members or the elevator belt by passing the tension members or the elevator belt over a plurality of sheaves during a manufacturing process.

7. The method of claim 6, further comprising:
providing one or more sheaves of the plurality of sheaves as a crowned sheave to provide pre-tensioning.

8. The method of claim 2, further comprising:
forming the tension members to comprise at least a first type of tension member and a second type of tension member; wherein
the pre-tensioning is accomplished by providing a first low load elongation for one or more tension members of the first type of tension member and providing a second low load elongation for one or more tension members of the second type of tension member; and
wherein the second low load elongation is different than the first low load elongation.

9. The method of claim 8, wherein the first type of tension members comprise one or more outermost edge tension members and the second type of tension members comprise one or more centermost tension members.

10. The method of claim 8, wherein the first low load elongation is higher than the second low load elongation.

11. The method of claim 1, wherein the elevator suspension member comprises an elevator belt having the tension members encased in a jacket, and wherein the pre-tensioning includes passing the elevator belt over a cylindrical body during a manufacturing process, and the pre-tensioning is configured to adjust low load elongation of the tension members within the elevator suspension member prior to placing the elevator belt in operation for an elevator.

12. The method of claim 1, including forming the tension members as steel cords that are each made from a plurality of wires twisted together and encasing the steel cords in a jacket to form an elevator belt, and wherein the pre-tensioning of the elevator suspension member comprises pre-stretching the elevator belt after the steel cords are encased in the jacket.

13. A method comprising: pre-tensioning an elevator suspension member to adjust low load elongation of tension members within the elevator suspension member prior to placing the elevator suspension member in operation for an elevator;

wherein the elevator suspension member comprises an elevator belt having a plurality of the tension members encased in a jacket; and applying the pre-tensioning to the elevator belt after encasing the tension members in the jacket.

14. The method of claim 13, further comprising:

pre-tensioning the elevator belt during installation of an elevator car in a hoistway.

15. The method of claim 14, further comprising:

supporting the elevator car in the hoistway with the elevator belt, and applying a pre-determined load to the elevator belt by adding weight to the elevator car; and wherein the pre-determined load is less than or equal to ¼ of a load rating of the elevator suspension member or the pre-determined load is greater than ⅙ of the load rating of the elevator suspension member.

16. The method of claim 15, further comprising:

supporting the elevator car with one or more additional elevator belts and applying the pre-determined load to each elevator belt.

17. The method of claim 15, further comprising:

removing the weight from the elevator car once a desired low load elongation is achieved and subsequently releasing the elevator car for operation.

18. A method comprising: pre-tensioning an elevator suspension member to adjust low load elongation of tension members within the elevator suspension member prior to placing the elevator suspension member in operation for an elevator;

wherein the elevator suspension member comprises an elevator belt having a plurality of the tension members encased in a jacket;

pre-tensioning one or more of the tension members or the elevator belt by passing the tension members or the elevator belt over a plurality of sheaves during a manufacturing process; and applying a restrictive force to one or more sheaves of the plurality of sheaves to achieve pre-tensioning.

19. An elevator suspension member comprising:

an elevator belt having a plurality of tension members encased in a jacket, and wherein the elevator belt is pre-tensioned to adjust low load elongation of tension members within the elevator belt prior to placing the elevator belt in operation for an elevator; and wherein the pre-tensioning is based on a load that is:

less than or equal to ¼ of a load rating of the elevator suspension member; or greater than ⅙ of the load rating of the elevator suspension member.

20. The elevator suspension member of claim 19, wherein the tension members comprise steel cords that are each formed from a plurality of wires that are all twisted together in one direction, and including:

applying the pre-tensioning to one or more of the tension members prior to encasing the tension members in the jacket, or applying the pre-tensioning to the elevator belt after encasing the tension members in the jacket.

21. The elevator suspension member of claim 19, wherein the plurality of tension members comprise at least:

a first type of tension member having a first low load elongation; and a second type of tension member having a second low load elongation, wherein the second type of tension member is positioned between a pair of the first type of tension member, and the second low load elongation is lower than the first low load elongation.

* * * * *